(12) United States Patent
Koehler et al.

(10) Patent No.: US 9,284,221 B2
(45) Date of Patent: Mar. 15, 2016

(54) DRY BUILDING MATERIAL FORMULATIONS CONTAINING POLYMER POWDERS

(71) Applicant: Wacker Chemie AG, Munich (DE)

(72) Inventors: Thomas Koehler, Allentown, PA (US); Reinhard Haerzschel, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/348,638

(22) PCT Filed: Oct. 2, 2012

(86) PCT No.: PCT/EP2012/069494
§ 371 (c)(1),
(2) Date: Mar. 31, 2014

(87) PCT Pub. No.: WO2013/050388
PCT Pub. Date: Apr. 11, 2013

(65) Prior Publication Data
US 2014/0243457 A1     Aug. 28, 2014

(30) Foreign Application Priority Data

Oct. 5, 2011 (DE) .................. 10 2011 084 048

(51) Int. Cl.
| | |
|---|---|
| C08K 3/36 | (2006.01) |
| C08L 29/04 | (2006.01) |
| C08L 31/04 | (2006.01) |
| C08J 3/12 | (2006.01) |
| C04B 16/04 | (2006.01) |
| C04B 28/02 | (2006.01) |
| C04B 40/00 | (2006.01) |
| C09D 131/02 | (2006.01) |
| C09J 131/02 | (2006.01) |
| C04B 103/00 | (2006.01) |
| C08K 9/08 | (2006.01) |

(52) U.S. Cl.
CPC ................. *C04B 16/04* (2013.01); *C04B 28/02* (2013.01); *C04B 40/0042* (2013.01); *C08J 3/122* (2013.01); *C08J 3/124* (2013.01); *C08L 29/04* (2013.01); *C08L 31/04* (2013.01); *C09D 131/02* (2013.01); *C09J 131/02* (2013.01); *C04B 2103/0057* (2013.01); *C08J 2331/04* (2013.01); *C08K 9/08* (2013.01)

(58) Field of Classification Search
USPC .................. 524/4, 5, 492, 847; 106/823, 819
See application file for complete search history.

(56) References Cited

U.S. PATENT DOCUMENTS

| | | |
|---|---|---|
| 5,959,017 A | 9/1999 | Eck et al. |
| 6,833,401 B1 | 12/2004 | Xue et al. |
| 2004/0198896 A1 | 10/2004 | Pakusch et al. |

FOREIGN PATENT DOCUMENTS

| | | | |
|---|---|---|---|
| CH | 499560 A | * | 11/1970 |
| EP | 0765899 A1 | | 4/1997 |
| EP | 1464665 A1 | | 10/2004 |
| WO | 01/29106 A1 | | 4/2001 |

OTHER PUBLICATIONS

Wesbond Corporation, Nyacol 2040, (Larger particle size colloidal silica), Copyright 2000, Aug. 2, 2004.

* cited by examiner

*Primary Examiner* — Kelechi Egwim
(74) *Attorney, Agent, or Firm* — Brooks Kushman P.C.

(57) ABSTRACT

Hydraulically setting compositions containing mineral binders exhibit improved adhesion when polymer powders produced by drying a silica sol and a redispersible polymer powder emulsion are added.

6 Claims, No Drawings

DRY BUILDING MATERIAL FORMULATIONS CONTAINING POLYMER POWDERS

CROSS-REFERENCE TO RELATED APPLICATIONS

This application is the U.S. National Phase of PCT Appln. No. PCT/EP2012/069494 filed Oct. 2, 2012, which claims priority to German Application No. 10 2011 084 048.6 filed Oct. 5, 2011, the disclosures of which are incorporated in their entirety by reference herein.

BACKGROUND OF THE INVENTION

1. Field of the Invention

The invention relates to dry building material formulations comprising polymer powders, to methods for producing them and to their use for example as building material compositions, such as tile adhesives, reinforcing compositions or self-levelling compositions.

2. Description of the Related Art

Dry building material formulations comprise hydraulically setting binders, such as cement, and also fillers, polymers in the form of water-redispersible powders (polymer powders), and optionally other additives. Building material formulations find application for example as tile adhesives, joint fillers, filling compositions, grouts, renders or screeds. Prior to application, water is added to the dry building material formulations (fresh mortars). A diverse range of requirements is imposed on building material formulations. For instance, fresh mortars are to possess good processing properties, and the cured mortar compositions are to exhibit high mechanical strengths and strong adhesion to various substrates, such as to mineral substrates or to insulating materials, such as polystyrene panels, for example. In order to set an optimum profile of properties, therefore, specific additives are frequently added to the building material formulations.

For instance, US 2007/0256600 A1 recommends improving the adhesion of building material compositions to polystyrene substrates by adding phosphate esters. A disadvantage, however, is the high price of these additives. EP 0698586 A1 teaches the use of aromatic polyethers for these purposes. Environmental concerns have arisen against such compounds. DE 102010042 003 A, lastly, proposes the addition of polypropylene oxides or of ethylene oxide-propylene oxide block copolymers. These adjuvants, although leading to a considerable improvement in the adhesion, also result in poorer processing properties for the fresh mortars.

The use of aluminium silicates or silicas as anti-blocking agents for polymer powders is known and described in DE-2214410, for example. Polymer powders therein were produced by spray drying polymer dispersions. In the course of the spray drying, anti-blocking agents were introduced in solid form simultaneously with, but spatially separate from, the polymer dispersions, into the spray-drying device. For an analogous method, DE-A 3101413 recommends the use of hydrophobic silicas in solid form as anti-blocking agents. GB 929704 deals generally with the spray drying of polymer dispersions for the purpose of producing storage-stable, water-redispersible polymer powders, and for these purposes teaches, for example, the addition of protective colloids, such as polyvinyl alcohols, or of inorganic particles, such as calcium carbonate or silica. CN-A 101125946 describes water-redispersible polymer powders comprising polyvinyl esters, calcium carbonate and optionally organosilicones.

DE-A1 4124588 discloses the preparation of finely divided silica microdispersions by hydrolysis of silicic esters in aqueous ammonia solution, and also the use thereof in polymer dispersions for use in stone strengtheners. EP-A 0765899, finally, addresses the equipping of polymer powders with liquid adjuvants, by applying the liquid adjuvants to a support substance, such as highly disperse silicas, and then blending the supported adjuvants with a polymer powder.

SUMMARY OF THE INVENTION

Against this background, an object of the invention was to provide dry building material formulations which lead to fresh mortars having better processing properties and which, moreover, result in cured mortar compositions which exhibit improved adhesion to various substrates, such as mineral substrates or insulating materials, more particularly polystyrene panels. This objective is especially relevant for lime-containing cementitious dry building material formulations.

These and other objects have surprisingly been solved by equipping dry building material formulations with polymer powders obtained by adding silica sols to aqueous polymer dispersions and drying the resulting dispersions to form polymer powders. It is essential, therefore, to add the silica sols to the aqueous polymer dispersions and not to admix the compounds comprising silicon dioxide exclusively, only, to the dried polymer powders; the latter approach corresponds to the conventional addition of anti-blocking agents, which does not achieve the object of the invention. The objects have unexpectedly been achieved even more effectively by also adding hydrolysed 1-alkylvinyl ester/vinyl ester copolymers to the polymer dispersions prior to their drying.

DETAILED DESCRIPTION OF THE PREFERRED EMBODIMENTS

The invention provides dry building material formulations comprising one or more hydraulically setting binders, one or more fillers, one or more polymers in the form of water-redispersible powders (polymer powders), and optionally one or more additives, characterized in that the polymer powders are obtainable by drying aqueous dispersions comprising one or more silica sols and one or more polymers of ethylenically unsaturated monomers.

The silica sols are solutions or colloidal suspensions of silicon dioxide particles ($SiO_2$) in aqueous medium. The silica sols comprise colloidal silica, waterglass or siliceous sols. As a solvent, the silica sols comprise water in general, and preferably no other solvents, such as organic solvents. The silica sols are therefore not in solid form. The silica sols generally have pH values of 7 to 10.

The particle size of the silicon dioxide particles is preferably 1 to 100 nm, more preferably 3 to 70 nm and most preferably 5 to 50 nm (determined by means of transmission electron microscopy with the Libra 120 instrument from Zeiss).

In water with a pH of 10 and a temperature of 25° C., the silica sols comprise preferably 2% to 50% by weight, more preferably 5% to 50% by weight, still more preferably 10% to 50% by weight and most preferably 20% to 50% by weight of silicon dioxide particles in dissolved or dispersed form, the figures in % by weight being based on the total weight of the silica sols. The presence of the silica sols in dissolved or dispersed form means that under the aforementioned conditions the silicon dioxide particles form a sedimentation-free mixture in water.

Based on the total weight of the polymer powders, the polymer powders comprise preferably 0.1% to 10% by weight, more preferably 0.5% to 5% by weight and more preferably 1% to 3% by weight of silicon dioxide particles which originate from silica sols.

The preparation of silica sols is common knowledge to the skilled person. Silica sols can be prepared, for example, by hydrolysis of tetraalkoxysilanes, as described in DE-A 4124588, for example. Particularly suitable for this purpose are tetramethoxysilanes or tetraethoxysilanes. The tetraalkoxysilanes may be admixed with up to 15% by weight, preferably up to 10% by weight, more preferably up to 2% by weight of organoalkoxysilanes. Alternatively it is possible to prepare silica sols pyrogenically by flame hydrolysis, of tetrachlorosilane, for example, as described in DE 2620737 or DE 4221716, for example. Waterglass is obtainable, for example, by melting silica sand together with alkali metal carbonates at 1400 to 1500° C. and then converting the melt into an aqueous solution.

The silica sols generally, therefore, do not comprise any hydrophobised silicas, of the kind known from EP0686676 A1, for example. Hydrophobised silicas as obtainable, for example, by silylating silicas with silylating agents. As a result of silylation, the OH groups located on the surfaces of the silica particles become terminated with silyl groups. Examples of silylating agents are haloalkylsilanes, haloalkoxysilanes or alkylalkoxysilanes.

Referred as polymers in the form of water-redispersible powders (polymer powders) are powder compositions which are accessible by means of drying of the corresponding aqueous polymer dispersions in the presence of protective colloids. By virtue of this production method, the finely divided polymer resin of the dispersion is coated with a sufficient quantity of a water-soluble protective colloid. During drying, the protective colloid acts like a jacket, preventing the particles from sticking together. When the polymer powders are redispersed in water, the protective colloid dissolves again in water, to give an aqueous dispersion of the original polymer particles (Schulze J. in TIZ, no. 9, 1985).

Suitable polymers of ethylenically unsaturated monomers are, for example, those based on one or more monomers from the group encompassing vinyl esters, (meth)acrylic esters, vinylaromatics, olefins, 1,3-dienes and vinyl halides and optionally further monomers copolymerizable with these. The polymers are preferably not crosslinked.

Suitable vinyl esters are those of carboxylic acids having 1 to 15 C atoms. Preferred are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 C atoms, for example VeoVa9® or VeoVa10® (trade names of Resolution). Particularly preferred is vinyl acetate.

Suitable monomers from the group of acrylic esters or methacrylic esters are esters of unbranched or branched alcohols having 1 to 15 C atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particularly preferred are methyl acrylate, methyl methacrylate, n-butyl acrylate, t-butyl acrylate and 2-ethylhexyl acrylate.

Preferred vinylaromatics are styrene, methylstyrene and vinyltoluene. A preferred vinyl halide is vinyl chloride. The preferred olefins are ethylene, propylene, and the preferred dienes are 1,3-butadiene and isoprene.

It is optionally possible also to copolymerize 0.1% to 5% by weight of auxiliary monomers, based on the total weight of the monomer mixture. It is preferred to use 0.5% to 2.5% by weight of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carbonitriles, preferably acrylamide and acrylonitrile; monoesters and diesters of fumaric acid and maleic acid such as the diethyl and diisopropyl esters and also maleic anhydride; ethylenically unsaturated sulphonic acids and their salts, preferably vinylsulphonic acid, 2-acrylamido-2-methyl-propanesulphonic acid. Other examples are pre-crosslinking comonomers such as polyethylenically unsaturated comonomers, examples being diallyl phthalate, divinyl adipate, diallyl maleate, allyl methacrylate or triallyl cyanurate, or post-crosslinking comonomers, examples being acrylamido glycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylol-methacrylamide and of N-methylolallylcarbamate. Also suitable are epoxide-functional comonomers such as glycidyl methacrylate and glycidyl acrylate. Other examples are silicon-functional comonomers, such as acryloyloxypropyltri(alkoxy)- and methacryloyloxypropyltri(alkoxy)silanes, vinyltrialkoxy-silanes and vinylmethyldialkoxysilanes, the alkoxy groups present being possibly, for example, ethoxy and ethoxy-propylene glycol ether radicals. Also included are monomers with hydroxyl or CO groups, examples being hydroxyalkyl esters of methacrylic acid and acrylic acid, such as hydroxyethyl, hydroxypropyl or hydroxybutyl acrylate or methacrylate, and also compounds such as diacetonacrylamide and acetylacetoxy-ethyl acrylate or methacrylate.

The monomer selection and the selection of the weight fractions of the comonomers are made such as to result in a glass transition temperature Tg of −25° C. to +25° C., preferably −10° C. to +10° C., more preferably −10° C. to 0° C. The glass transition temperature Tg of the polymers can be determined in a known way by means of differential scanning calorimetry (DSC). The Tg may also be calculated approximately in advance by means of the Fox equation. According to Fox T. G., Bull. Am. Physics Soc. 1, 3, page 123 (1956) the following applies: $1/Tg = x_1/Tg_1 + x_2/Tg_2 + \ldots + x_n/Tg_n$, where $x_n$ stands for the mass fraction (% by weight/100) of the monomer n, and $Tg_n$ is the glass transition temperature in kelvins of the homopolymer of the monomer n. Tg values for homopolymers are listed in Polymer Handbook 2nd Edition, J. Wiley & Sons, New York (1975).

Preferred are copolymers of vinyl acetate with 1% to 50% by weight of ethylene; copolymers of vinyl acetate with 1% to 50% by weight of ethylene and 1% to 50% by weight of one or more further comonomers from the group of vinyl esters having 1 to 12 C atoms in the carboxylic acid residue, such as vinyl propionate, vinyl laurate, vinyl esters of alpha-branched carboxylic acids having 9 to 13 C atoms, such as VeoVa9, VeoVa10 and VeoVa11; copolymers of vinyl acetate, 1% to 50% by weight of ethylene and preferably 1% to 60% by weight of (meth)acrylic esters of unbranched or branched alcohols having 1 to 15 C atoms, more particularly n-butyl acrylate or 2-ethylhexyl acrylate; and copolymers with 30% to 75% by weight of vinyl acetate, 1% to 30% by weight of vinyl laurate or vinyl esters of an alpha-branched carboxylic acid having 9 to 11 C atoms, and also 1% to 30% by weight of (meth)acrylic esters of unbranched or branched alcohols having 1 to 15 C atoms, more particularly n-butyl acrylate or 2-ethylhexyl-acrylate, which also contain 1 to 40% by weight of ethylene; copolymers with vinyl acetate, 1% to 50% by weight of ethylene and 1% to 60% by weight of vinyl chloride; the polymers here may also comprise the stated auxiliary monomers in the stated amounts, and the figures in % by weight add up to 100% by weight in each case.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate; styrene-acrylic ester copolymers with one or more monomers from the group of methyl acrylate, ethyl acrylate, propyl acrylate, n-butyl acrylate, 2-ethylhexyl acrylate; vinyl acetate-acrylic ester copolymers with one or more monomers from the group of methyl acrylate, ethyl acrylate, propyl acrylate, n-butyl acrylate, 2-ethylhexyl acrylate and optionally ethylene; styrene-1,3-butadiene copolymers; the polymers here may also comprise the stated auxiliary monomers in the stated amounts, and the figures in % by weight add up to 100% by weight in each case.

Most preferred are water-redispersible polymer powders comprising copolymers with vinyl acetate and 5% to 50% by weight of ethylene, or copolymers with vinyl acetate, 1% to 50% by weight of ethylene and 1% to 50% by weight of a vinyl ester of α-branched monocarboxylic acids having 9 to 11 C atoms, or copolymers with 30% to 75% by weight of vinyl acetate, 1% to 30% by weight of vinyl laurate or vinyl esters of an alpha-branched carboxylic acid having 9 to 11 C atoms, and also 1% to 30% by weight of (meth)acrylic esters of unbranched or branched alcohols having 1 to 15 C atoms, which also contain 1% to 40% by weight of ethylene, or copolymers with vinyl acetate, 5% to 50% by weight of ethylene and 1% to 60% by weight of vinyl chloride.

The polymer powders preferably comprise 50% to 90% by weight of polymers of ethylenically unsaturated monomers, based on the total weight of the polymer powders.

The dry building material formulations preferably comprise 0.1% to 25% by weight, more preferably 0.3% to 10.0% by weight and most preferably 0.5% to 5.0% by weight of polymer powders, based in each case on the total weight of the dry building material formulations.

Suitable hydraulically setting binders are, for example, cements, more particularly Portland cement, aluminate cement, trass cement, slag cement, magnesia cement, phosphate cement or blast furnace cement, and also mixed cements, filling cements, flyash, microsilica, hydraulic lime and gypsum. Preference is given to Portland cement, aluminate cement and slag cement, and also to mixed cements, filling cements, hydraulic lime and gypsum. Also preferred are mixtures of two or more hydraulically setting binders, comprising more particularly cement and hydraulic lime.

Generally speaking, the dry building material formulations comprise 5% to 50% by weight, preferably 10% to 30% by weight of hydraulically setting binders, based in each case on the total weight of the dry building material formulations.

Examples of suitable fillers are silica sand, finely ground quartz, calcium carbonate, dolomite, aluminium silicates, clay, chalk, white hydrated lime, talc or mica, or else lightweight fillers such as pumice, foamed glass, gas concrete, perlite, vermiculite and carbon nanotubes (CNTs). It is also possible to use any desired mixtures of the stated fillers. Preferred are silica sand, finely ground quartz, calcium carbonate, chalk or white hydrated lime.

Generally speaking, the dry building material formulations comprise 30% to 90% by weight, preferably 40% to 85% by weight, of fillers, based in each case on the total weight of the dry building material formulations.

Other customary adjuvants for the dry building material formulations are thickeners, examples being polysaccharides such as cellulose ethers and modified cellulose ethers, starch ethers, guar gum, xanthan gum, phyllosilicates, polycarboxylic acids such as polyacrylic acid and their partial esters, and also polyvinyl alcohols, which may optionally have been acetalized or hydrophobically modified, casein, and associative thickeners. Customary adjuvants also include retardants, such as hydroxycarboxylic acids, or dicarboxylic acids or their salts, saccharides, oxalic acid, succinic acid, tartaric acid, gluconic acid, citric acid, sucrose, glucose, fructose, sorbitol and pentaerythritol. Setting accelerators are a customary additive, examples being alkali metal salts or alkaline earth metal salts of organic or inorganic acids. In addition, the following may be mentioned: hydrophobizers, preservatives, film-forming assistants, dispersants, foam stabilizers, defoamers and flame retardants (e.g. aluminium hydroxide).

The adjuvants are used in the amounts customary for them, which are dependent on the nature of the adjuvant. Generally speaking, the amounts are 0.1% to 10% by weight, based in each case on the total weight of the dry building material formulations.

The polymers are prepared by the emulsion polymerization process or by the suspension polymerization process, in the presence of protective colloids, preferably by the emulsion polymerization process, with the polymerization temperature being generally 20° C. to 100° C., preferably 60° C. to 90° C., with the possibility, in the case of the copolymerization of gaseous comonomers such as ethylene, of operating under pressure, generally at between 5 bar and 100 bar. The polymerization is initiated using the water-soluble and/or monomer-soluble initiators, or Redox initiator combinations, that are customary for emulsion polymerization or suspension polymerization, respectively. Examples of water-soluble initiators are sodium persulphate, hydrogen peroxide and azobisisobutyronitrile. Examples of monomer-soluble initiators are dicetyl peroxydicarbonate, dicyclohexyl peroxydicarbonate and dibenzoyl peroxide. The stated initiators are used generally in an amount of 0.01% to 0.5% by weight, based on the total weight of the monomers. As Redox initiators, combinations of the stated initiators in combination with reducing agents are used. Examples of suitable reducing agents are sodium sulphite, sodium hydroxymethanesulphinate and ascorbic acid. The amount of reducing agent is preferably 0.01% to 0.5% by weight, based on the total weight of the monomers.

To control the molecular weight it is possible to use regulating substances during the polymerization. If regulators (chain transfer agents) are used, they are employed typically in amounts between 0.01% to 5.0% by weight, based on the monomers to be polymerized, and are metered in separately or else as a premix with reaction components. Examples of such substances are n-dodecyl mercaptan, tert-dodecyl mercaptan, mercaptopropionic acid, methyl mercaptopropionate, isopropanol and acetaldehyde. It is preferred not to use any regulating substances.

The polymerization batch is stabilized using protective colloids, optionally in combination with emulsifiers. Suitable protective colloids are partially hydrolysed or fully hydrolysed polyvinyl alcohols; polyvinylpyrrolidones; polyvinyl acetals; polysaccharides in water-soluble forms such as starches (amylase and amylopectin) or dextrins or cyclodextrins, celluloses and their carboxymethyl, methyl, hydroxyethyl and hydroxypropyl derivatives; proteins such as casein or caseinate, soya protein, gelatine; lignosulphonates; synthetic polymers such as poly(meth)acrylic acid, copolymers of (meth)acrylates with carboxyl-functional comonomer units, poly(meth)acrylamide, polyvinylsulphonic acids and their water-soluble copolymers; melamine-formaldehyde sulphonates, naphthalene-formaldehyde sulphonates, styrene-maleic acid copolymers and vinyl ether-maleic acid copolymers; cationic protective colloids, for example polymers with monomer units having quaternary ammonium groups. Preferred are partially hydrolysed or fully hydrolysed polyvinyl alcohols. Particularly preferred are partially hydrolysed polyvinyl alcohols having a degree of hydrolysis of 80 to 95 mol % and a Höppler viscosity in 4% strength aqueous solution of 1 to 30 mPas (Höppler method at 20° C., DIN 53015).

After the end of the polymerization, residual monomers can be removed, employing known methods, by post-polymerization, as for example by post-polymerization initiated with redox catalyst. Volatile residual monomers can also be removed by means of distillation, preferably under reduced pressure, and optionally with inert entraining gases such as air, nitrogen or steam being passed through or over the batch.

The aqueous polymer dispersions obtainable in this way preferably have a solids content of 30% to 75% by weight, more preferably 50% to 60% by weight.

For the present invention it is essential that one or more silica sols are added to the polymer dispersions prior to their drying. Generally speaking, therefore, the silica sols are added to the polymer dispersions before the polymer dispersions are introduced into a drying device, such as spray-drying, fluid-bed drying or freeze-drying systems. The silica sols, then, are introduced into the drying device simultaneously and spatially jointly with the polymers. The silicon dioxide compounds used in accordance with the invention, i.e. the silica sols, are therefore not added after the drying, i.e. not to the polymer powders obtained by means of drying.

The polymer dispersions prior to drying preferably comprise 0.1% to 10% by weight, more preferably 0.5% to 5% by weight and most preferably 1% to 3% by weight of silica sols, the figures in % by weight being based on the solids content of the silica sols and referring to the dry weight of the polymer dispersions.

In one preferred embodiment, the polymer dispersions are admixed prior to their drying additionally with one or more hydrolysed 1-alkylvinyl ester/vinyl ester copolymers. Hydrolysed 1-alkylvinyl ester/vinyl ester copolymers are therefore added to the polymer dispersions preferably after the polymerization. The hydrolysed 1-alkylvinyl ester/vinyl ester copolymers are preferably introduced into the drying device simultaneously and spatially jointly with the polymers.

Hydrolysed 1-alkylvinyl ester/vinyl ester copolymers contain preferably 65% to 95% by weight of vinyl alcohol units and 5% to 35% by weight of 1-alkylvinyl alcohol units having C1 to C4 alkyl groups. Particularly preferred 1-alkylvinyl alcohol units are 1-methylvinyl alcohol units. The Höppler viscosity of the hydrolysed 1-alkylvinyl ester/vinyl ester copolymers is preferably 1 to 5 mPas and more preferably 1.5 to 4.0 mPas (Höppler method in accordance with DIN 53015, measured in 4% strength aqueous solution at 20° C.). These copolymers are obtainable by copolymerization of vinyl acetate with isopropenyl acetate and subsequent hydrolysis. The preparation is described in DE-A 3724332.

The polymer powders preferably comprise 1% to 8% by weight and more preferably 1% to 5% by weight of one or more hydrolysed 1-alkylvinyl ester/vinyl ester copolymers, based on the total weight of the polymer powders.

The mixing of the polymer dispersions with the silica sols and optionally with the hydrolysed 1-alkylvinyl ester/vinyl ester copolymers is not tied to any particular procedure or devices. The mixing of the individual components here may be carried out simultaneously or in succession in any order.

The mixing may take place in the customary reactors or mixing vessels. Generally speaking, mixing takes place at temperatures of 5 to 35° C.

Furthermore, the polymer dispersions are generally admixed with further protective colloids as a drying aid. In general the drying aid is used in a total amount of 0.5% to 30% by weight, based on the solids content of the polymer dispersion. This means that the total amount of protective colloid prior to the drying operation is to be at least 1% to 30% by weight, based on the solids content of the polymer dispersion; it is preferred to use 5% to 20% by weight, based on the solids content of the polymer dispersion.

Suitable drying aids are known to the skilled person and are, for example, the protective colloids already specified.

Particularly preferred are partially hydrolysed polyvinyl alcohols having a degree of hydrolysis of 80 to 95 mol % and a Höppler viscosity in 4% strength aqueous solution of 1 to 30 mPas (Höppler method at 20° C., DIN 53015).

After the components have been mixed, the polymer dispersions are dried. The dispersions may be dried by means, for example, of fluid-bed drying, freeze drying or spray drying. The dispersions are preferably spray dried. Spray drying in this case takes place in customary spray-drying systems, with atomization able to take place by means of one-fluid, two-fluid or multi-fluid nozzles or by a rotating disc. The exit temperature is generally selected to be in the range from 45° C. to 120° C., preferably 60° C. to 90° C., depending on the system, Tg of the resin and desired degree of drying. The viscosity of the feed to be atomized is adjusted via the solids content so as to give a value of <500 mPas (Brookfield viscosity at 20 revolutions and 23° C.), preferably <250 mPas. The solids content of the dispersion to be atomized is preferably 30% to 75% by weight and more preferably 50% to 60% by weight.

For the atomization an amount of up to 1.5% by weight of anti-foam agent, based on the polymer, has proved to be favourable in many cases.

To increase the storage life by improving the blocking stability, especially in the case of polymer powders with a low glass transition temperature, the polymer powder obtained may be furnished with one or more anti-blocking agents (anti-caking agents), preferably 1% to 30% by weight, based on the total weight of polymeric constituents. Examples of anti-blocking agents are Ca carbonate and Mg carbonate, talc, gypsum, silica, kaolins such as metakaolin, and silicates, having particle sizes preferably in the range from 10 nm to 10 μm. Anti-blocking agents based on silicon dioxide, such as silicas or silicates, however, generally have particle sizes of 200 nm to 10 μm and more particularly 500 nm to 10 μm. The anti-blocking agents can be dispersed without sedimentation in water at a pH of 10 and at a temperature of 25° C., customarily to an extent of considerably less than 1% by weight, based on the total weight of the dispersion.

The anti-blocking agents are therefore generally added in the form of solids. The anti-blocking agents may be introduced into the drying device simultaneously with but spatially separately from the dispersions. The anti-blocking agents are therefore not added to the polymer dispersions prior to drying.

Silicon dioxide compounds which have once been present in solid form can no longer be converted into the silica sols of the invention simply by adding water. The reason for this is aggregation processes which occur on isolation of the silicon dioxide compounds. Such aggregation processes also occur if the polymer dispersions and the silica sols are introduced spatially separately from one another into the drying device.

The invention further provides methods for producing dry building material formulations by mixing one or more hydraulically setting binders, one or more fillers, one or more polymers in the form of water-redispersible powders (polymer powders), and optionally one or more additives, characterized in that the polymer powders are prepared by drying aqueous dispersions comprising one or more polymers of ethylenically unsaturated monomers and one or more silica sols.

The dry building material formulations are generally produced by mixing and homogenizing one or more hydraulically setting binders, one or more fillers, one or more polymer powders and optionally one or more adjuvants to form a dry mix. The quantity of water needed for processing of the dry building material formulations is added prior to final preparation.

The dry building material formulations of the invention are suitable, for example, for the production of reinforcing compositions for thermal insulation composite systems, or for producing adhesives or coating materials. Examples of adhesives are adhesives for thermal insulation panels and soundproofing panels, tile adhesives, and adhesives for bonding wood and wood-based materials. Examples of coating materials are mortars, levelling compositions, screeds and renders.

The dry building material formulations of the invention can be used to gain access to building material compositions which are distinguished by outstanding adhesion to various substrates, such as mineral substrates or insulating materials, more particularly polystyrene panels. Surprisingly, the improved adhesion has been achieved with polymer powders prepared using silica sols. It was not hitherto known that the adhesion properties of building material compositions could be boosted with silicon dioxide compounds of this kind. This finding was all the more surprising in view of the fact that the conventional addition of silicon dioxide compounds, such as silicas or silicates, in solid form, as anti-blocking agents, did not produce polymer powders that achieved the object according to the invention. It proved to be essential to mix the polymers and the silicon dioxide particles intimately in the form of silica sols, in a way which can only be done if not only the polymers but also the silicon dioxide particles are present jointly in aqueous and dispersed form. In this case there is an intense interaction between the silicon dioxide particles and the other constituents of the polymer dispersions. Therefore, when the polymer dispersions are dried in accordance with the invention, there is also not a self-condensation of the silicon dioxide compounds in the silica sols to the same extent as occurs in the drying of pure silica sols. For this reason as well, the polymer powders of the invention differ structurally from conventional polymer powders to which, for example, silica or silicates have been added as anti-blocking agents.

The adhesion effect achieved with the dry building material formulations of the invention has surprisingly been enhanced still further with polymer powders of the invention additionally comprising hydrolysed 1-alkylvinyl ester/vinyl ester copolymers. The inventive use of silica sols and the hydrolysed 1-alkylvinyl ester/vinyl ester copolymers acts synergistically with regard to the adhesion properties of the building material compositions.

The building material compositions obtainable in accordance with the invention are notable, furthermore, for outstanding processing properties. Without being tied to a theory, it is assumed that aqueous building material compositions of dry building material formulations of the invention are able to stabilize air more effectively than conventional building material compositions, thereby giving the building material compositions of the invention easier processing qualities. Against this background, it was all the more surprising that at the same time the building material compositions produced in accordance with the invention also adhere better to substrates. Indeed, a greater stabilization of air ought, in accordance with expectation, to have an adverse effect on the adhesion of the building material compositions to substrates. Instead, in the case of the procedure according to the invention, better processing properties and at the same time better adhesion of the building material compositions to substrates have been found. These effects are of particular interest especially in the case of building material compositions comprising lime.

The examples which follow serve for further elucidation of the invention.

Preparation of the Polymer Powders:

Dispersion Powder 1:

400 parts by weight of an aqueous polymer dispersion (vinyl acetate-ethylene copolymer; Tg of −7° C.; solids content 50%; stabilized with polyvinyl alcohol (Höppler viscosity of 5 mPas, degree of hydrolysis of 88 mol %)) were admixed with 40 parts by weight of an aqueous solution of a polyvinyl alcohol (Höppler viscosity of 5 mPa·s, degree of hydrolysis of 88 mol %; solids content 20%) and with 20 parts by weight of an aqueous solution of PME (fully hydrolysed copolymer of isopropenyl acetate and vinyl acetate, having a degree of hydrolysis of >98%, Höppler viscosity of 2.3 mPa·s, isopropenyl acetate fraction of 20 mol %; solids content 20%) and also with 10 parts by weight of silica sol (Bindzil 2040, trade name of Ekanobel; solids content 40%) and with 75 parts by weight of water, and the components where thoroughly mixed.

The resulting dispersion was sprayed using a two-fluid nozzle. The atomizing component was 4 bar compressed air, and the droplets formed were dried in countercurrent with air heated at 125° C. The dry polymer powder was admixed with 12% by weight of commercial anti-blocking agent (mixture of calcium carbonate and kaolin).

Dispersion Powder 2 (Comparative Powder 2):

Analogously to dispersion powder 1, with the difference that 40 parts by weight of the aqueous solution of PME, but no silica sol, were used.

Dispersion Powder 3:

Analogously to dispersion powder 1, with the difference that 20 parts by weight of the silica sol (Bindzil 2040), but no PME, were used.

Dispersion Powder 4 (Comparative Powder 4):

Analogously to dispersion powder 1, with the difference that no PME and no silica sol were used.

Production and Testing of the Mortar Compositions

To produce mortar compositions for the Inventive and Comparative Examples 1 to 4, the constituents identified in Table 1, in the amounts listed therein, were stirred with in each case the amounts of water stated in Table 1, to form the mortar composition.

For testing, the mortar compositions were each applied as reinforcing mortars in a layer thickness of 4 mm to EPS (expanded polystyrene) panels.

After the reinforcing layer had been cured and the test assemblies stored, the tensile adhesive strength and also the extraction on EPS panels were ascertained in accordance with test method DIN 18555-6. Storage took place under two different conditions:

14 days under standard conditions at 23° C. and 50% relative humidity (SC), or 12 days under standard conditions and then 2 days of water storage at 23° C.

The results of the testing are assembled in Table 1.

The results in Table 1 show that the inventively modified mortars (Table 1: Inventive Examples 1 and 3) enhance the adhesion (see tensile adhesion values and EPS extraction) to the thermal insulating panel in comparison with Comparative Example 4. The joint use of Bindzil and PME leads to the best results in terms of tensile adhesion and EPS extraction (Table 1: Inventive Examples 1 and 3).

TABLE

Adhesion and extraction of the adhesives on EPS:

|  | Inv. Ex. 1 | Comp. Ex. 2 | Inv. Ex. 3 | Comp. Ex. 4 |
|---|---|---|---|---|
| Formula (constituents in parts by weight) | | | | |
| White cement 42.5 | 130 | 130 | 130 | 130 |
| Refined hydrated lime | 40 | 40 | 40 | 40 |
| Silica sand AKW 9a | 520 | 520 | 520 | 520 |
| Calcium carbonate MHS | 283.5 | 283.5 | 283.5 | 283.5 |
| Cellulose ether | 1.5 | 1.5 | 1.5 | 1.5 |
| Dispersion powder 1 | 25 | | | |
| Dispersion powder 2 | | 25 | | |
| Dispersion powder 3 | | | 25 | |
| Dispersion powder 4 | | | | 25 |
| Water in ml per 1000 g | 250 | 250 | 250 | 250 |
| Test results: | | | | |
| Tensile adhesion N/mm$^2$ (14 d SC) | 0.13 | 0.11 | 0.12 | 0.09 |
| Tensile adhesion N/mm$^2$ (12 d SC + 2d H$_2$O) | 0.10 | 0.08 | 0.08 | 0.05 |
| EPS extraction % (14 d SC) | 100 | 80 | 85 | 60 |
| EPS extraction % (12 d SC + 2d H$_2$O) | 80 | 60 | 55 | 25 |

The invention claimed is:

1. A method for producing dry building material formulations, comprising mixing one or more hydraulically setting binders, one or more fillers, one or more polymers in the form of water-redispersible polymer powders, and optionally one or more additives, wherein the polymer powders are prepared by drying aqueous dispersions comprising one or more silica sols and one or more polymers of ethylenically unsaturated monomers.

2. The method of claim 1, wherein the one or more silica sols are added to a previously prepared polymer dispersion, prior to drying.

3. The method of claim 1, wherein the one or more silica sols are solutions or colloidal dispersions of silicon dioxide particles in an aqueous medium.

4. The method of claim 1, wherein the one or more silica sols are selected from the group consisting of colloidal silica, waterglass, siliceous sols, and mixtures thereof.

5. The method of claim 1, wherein at least one of one or more silica sols contains 2 to 50 weight percent of silicon dioxide particles in dissolved and/or dispersed form, the weight percent based on the total weight of the silica sol.

6. The method of claim 1, wherein the amount of the one or more silica sols is sufficient to provide, based on the weight of the polymer powder, from 1 to 30 weight percent of silica.

* * * * *